United States Patent [19]

Yamamoto et al.

[11] 4,114,890
[45] Sep. 19, 1978

[54] REPRODUCTION APPARATUS FOR A GAME

[75] Inventors: Hiroshi Yamamoto, Kawasaki; Shigetada Fukuoka, Tokyo, both of Japan

[73] Assignee: Nippon Kogaku K.K., Tokyo, Japan

[21] Appl. No.: 705,125

[22] Filed: Jul. 14, 1976

[30] Foreign Application Priority Data

Jul. 15, 1975 [JP] Japan ................................. 50-85792

[51] Int. Cl.² ........................ A63F 3/02; G09B 19/22
[52] U.S. Cl. ................................... 273/237; 35/8 A
[58] Field of Search ............... 35/8 A, 8 R; 40/28 C, 40/52 R; 235/92 GA; 273/85 R, 1 E, 136 A, 137 A, 130 AB, 237–238; 340/323 R

[56] References Cited

U.S. PATENT DOCUMENTS

| 3,579,856 | 5/1971 | Way | 35/8 R |
| 3,612,654 | 10/1971 | Klein | 40/52 R X |
| 3,645,604 | 2/1972 | Ngo | 40/52 R X |
| 3,654,392 | 4/1972 | Beinhocker et al. | 273/136 A X |
| 3,654,619 | 4/1972 | Tishman | 35/8 A X |
| 3,729,731 | 4/1973 | Konnerth et al. | 40/52 R X |
| 3,736,043 | 5/1973 | Sambucetti | 40/28 C X |
| 3,756,693 | 9/1973 | Ota | 40/52 R X |
| 3,760,404 | 9/1973 | Khlebutin | 273/136 A X |
| 3,888,491 | 6/1975 | Bernard et al. | 273/136 A |
| 3,897,643 | 8/1975 | Morris et al. | 40/28 C |
| 3,923,306 | 12/1975 | Cahn-Hidalgo et al. | 273/136 A |

FOREIGN PATENT DOCUMENTS

| 750,828 | 1/1967 | Canada | 273/237 |
| 697,800 | 11/1965 | Italy | 273/237 |

*Primary Examiner*—Vance Y. Hum
*Attorney, Agent, or Firm*—Shapiro and Shapiro

[57] ABSTRACT

Apparatus reproducing a game, such as GO, which employs two kinds of stones or pieces. The apparatus includes an information pick-up, a plurality of display elements and controllers for operating the display elements. The information pick-up picks up desired information from a recording medium which provides information as to the positions of the respective stones placed sucessively by each opponent in an alternate order. The display elements designate each of the two kinds of stones and the fact that no stone is placed. The controllers are actuated in dependence on the output of the information pick-up.

3 Claims, 17 Drawing Figures

REPRODUCTION APPARATUS FOR A GAME

BACKGROUND OF THE INVENTION

1. Field of the Invention

This invention relates to an apparatus for reproducing a game using two kinds of stones or pieces, such as for example, GO or OTHELLO.

2. Description of the Prior Art

In GO, for example, a paper showing several or several tens of plays is used to teach progress of a match. If one wants to study the match with reference to such a paper, one has to trace the plays in sequence. However, as many plays are written in the paper it is very inconvenient to consider the meaning of each play.

SUMMARY OF THE INVENTION

The object of this invention is to provide an apparatus to reproduce so easily the content of a game employing two kinds of stones or pieces such as in GO.

According to this invention, the apparatus comprises a reproducing means for reproducing a recording medium recording at least information of the places of the stones or pieces which are successively played, a memory station for memorizing the information successively sent out from the reproducing means and means for displaying the pieces or stones dependent on the recorded information.

DESCRIPTION OF THE PREFERRED EMBODIMENTS

Figure 1:
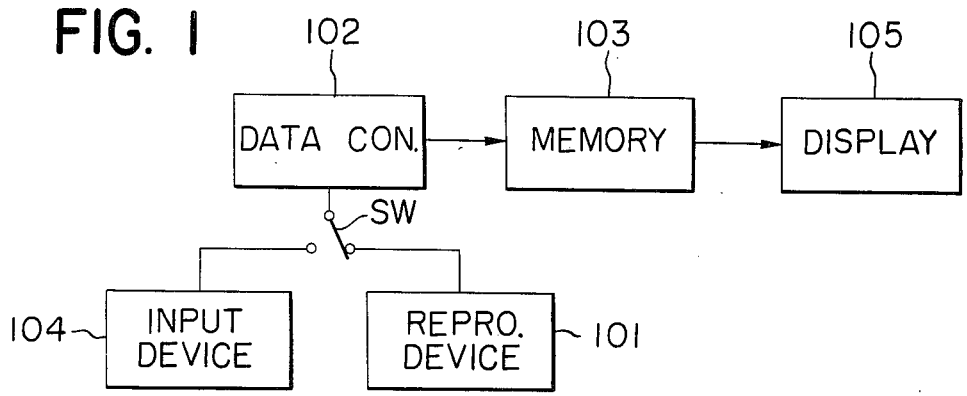
FIG. 1 is a block diagram of this invention.

This invention will be described in detail referring to the embodiments shown in the drawing.

In FIG. 1, which is a block diagram of the fundamental structure, information for each play representing the place and the kind of stone is already and successively stored in a memory medium such as magnetic tape, and when this magnetic tape is put in a reproducing device 101, the reproducing device will convert the information into electric signals for supplying the electric signals to a data converter 102 through conversion switch SW. Data converter 102 temporarily stores signals representative of the aforementioned positions and kinds of stones coming out from a tape unit and converts them into signals adaptable to a display unit described later. Memory 103 memorizes the output signals of converter 102. Display 105 represents stone positions on GO board 111 (refer to FIG. 2) in response to the output information stored in a tape through memory 103.

Figure 2:
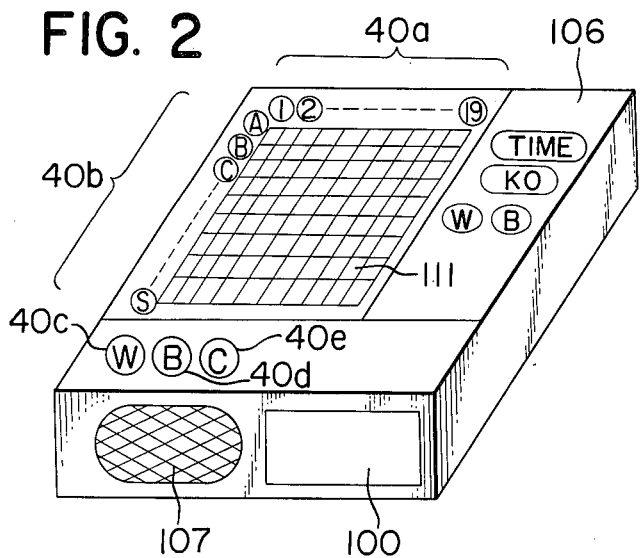
FIG. 2 is an external view of an embodiment of this invention.
Figure 3A:
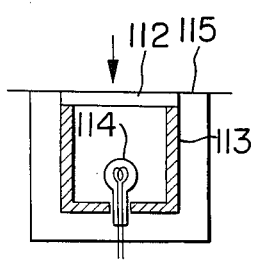
FIG. 3a is an example of a display element of the invention.

In FIG. 2, which represents an example of the external appearance of the reproduction apparatus, board 111 which is a GO-board, has 19 horizontal lines (A through S) and vertical lines (1 through 19) and a display element is located at each crossing point. FIG. 3a shows an example of the display element. A window 112 forming a part of the top surface of the board 111 is a circular mat surface in the top view. The opening area of the window represents the size of one stone or piece. Side wall 113 of a recess under window 112 is painted black and lamp 114 is located in the recess.

Figure 3B:
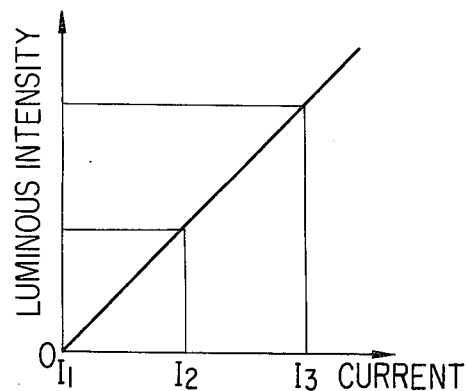
FIG. 3b is a graph showing a relationship between current through the display element and the luminous intensity of the window.

When current $I_2$ shown in FIG. 3b is fed to lamp 114, brightness of window 112 is the same as that of other parts of the board 111, which represents no stone placed, and a white stone can be represented by current $I_3$ of FIG. 3b by means of distinguishing a brighter window 112 from the surroundings. On the other hand, a black stone can be represented by cutting the current, as $I_1$ in FIG. 3b. Thus the window becomes dark or black due to the black wall 113. Such current can be controlled by the output of data converter 102, i.e., the output of memory 103, at which information is fed from a tape. When a main switch, which is not shown, is turned on, the current $I_2$ passes in all elements $19 \times 19$, and, if the information from the tape is black stone at 4D, for instance, memory 103 memorizes the information fed from converter 102 and turns off the current of a lamp 114 representing the position of 4D. By this, the brightness difference between this position and the surroundings can represent that a black stone is placed at 4D. If successive information from the tape is white stone at 4F, then the information is memorized at memory 103, the current $I_3$ is fed to lamp 114 at 4F and a white stone can be represented.

Thus, a GO arrangement of stones can be represented by the information from the tape on display board 111. An example of the memory 103 can be a latching relay (self-holding relay for controlling the current fed to lamp 114 which relay can hold a state of cut-off, flowing of current $I_3$ or flowing of current $I_2$. This latching relay is controlled by the output of the converter 102.

And also, captured stones can be represented as no stone, if the information of the position of the captured stone and the magnitude of the current $I_2$ are stored in the tape.

Figure 4A:
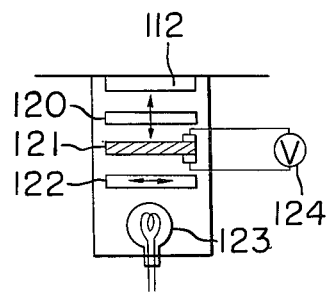
FIG. 4a is an another example of the display element.

In FIG. 4(a), another example of the display element will be explained, the element using Pb1 - (3/2) × La($H_f$, $T_{i(1-y)}$)$O_3$, $P_aL_a(Z_rT_i)O_3$, $KH_2PO_4$ $L_iN_bO_3$, $KS_{r2}N_{b5}O_{15}$ or boron substituted with inorganic agents.

Figure 4B:
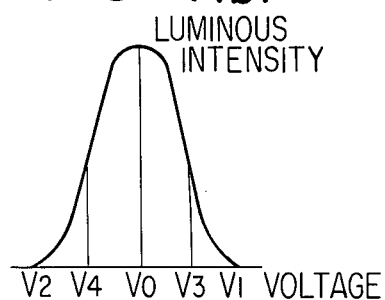
FIG. 4b is a graph showing a relationship between voltage applied and luminous intensity of the window.

In FIG. 4a, analyser 120, electro-optic light control element 121, polarizer 122, and lamp 123 are fixed under window 112 of a glass plate coated with antireflection film on both surfaces. The relation between the voltage applied to electro-optic light control element 121 and the brightness of the window illuminated by lamp 123 is shown in FIG. 4b.

A white stone is represented by brightness of the window 112 at the voltage of V0 and a black stone is at V1 or V2, and brightness at V3 or V4 is the same as the other surfaces of the board, where no stone is placed. Accordingly, representation of a white or black stone can be controlled by changing voltage applied to a voltage controller by means of data converter 102 controlled by information from the tape.

A Varad element also can be used instead of the electro-optic light control element.

A DSM liquid crystal, a twist type liquid crystal or a thermo liquid crystal may be used, and a PDS liquid crystal, a liquid crystal using a color polarizer, and a liquid crystal with dying agents can permit color representation instead of black-and-white representation.

The abovementioned elements require excitation by voltage or current during the operation. The following examples are elements which do not require such excitation.

Figure 5A:
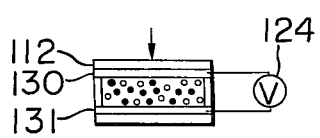
FIGS. 5(a)–5(c) show an example of a memory-type display element.
Figure 5B:
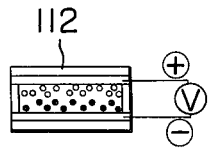
Figure 5C:
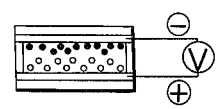

FIG. 5 shows an example of a representation using electrophoretic elements. Titanium oxide as white dying agent and azo dye as black dye in benzene and vegetable oil solvent are sealed between two transparent plates 130 and 131. When about 200 V is applied as shown in FIG. 5b to two plates 130 and 131 through voltage controller 124, titanium oxide charged negative is collected at the positive pole and it becomes white, and Azo agent at the negative pole and it becomes black. And even if the voltage is turned off, the color can be maintained. If the applied voltage is under 200 V as shown in FIG. 5a, the amount of collected titanium oxide and azo dyes may be controlled, and a half-tone color can be obtained. If the color of display board 111 is the same as the half-tone color, no stone is represented. Half-tone can be maintained after removal of the voltage. Therefore, once the voltage is applied to the elements 19×19 on the board in order to produce the half-tone condition, the board represents no stone placed. When information representing black stones is supplied from data converter 102, voltage controller 124 is operated by the converter 102 so as to apply a certain negative voltage (in the example 200 V) to the pole 130 positioned at the side of the window 112. By this effect, a black agent is attracted or collected to the electrode 130 and window 112 represents a black stone placed as shown in FIG. 5c. If white stone information comes, the inverse voltage is applied to form a white stone representative as shown in FIG. 5b.

Now, we describe position control.

Figure 6:
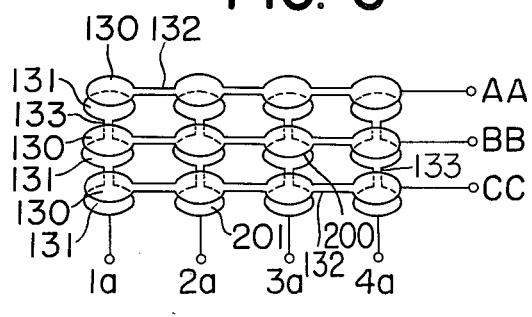
FIG. 6 shows a structure of an electrode of the memory-type display element.

In FIG. 6, which represents the structure of the electrode, the electrode 130 above the electrophoretic element is connected together by lead 132 for every line, and the lower electrode 131 is connected together by lead line 133 for every column. The figure shows for simplification 3 lines and 4 columns but a real GO board 111 has 19 lines and 19 columns.

Such electrode construction can be realized to activate for example, an element 200 by applying voltage to leads 3a and BB, and in the same manner, to activate 201 requires application of voltage to 2a and CC. The total number of the leads is 19+19 which permits reduction of the number.

This memory-type display element has not only a function of a display device 105, but also a function of a memory 103.

A memory-type liquid crystal, plasma display panel, a biologic cell and other oxidation-reduction reaction cells can be used as well as an electrochromic element described in the U.S. Pat. No. 3,521,941 for such memory-type display elements.

Figure 7:
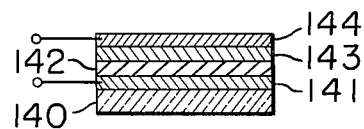
FIG. 7 shows a cross section of another example of the memory-type display unit.

FIG. 7, represents an electrochromic element which is composed of glass substrate 140 on which transparent electrode 141 such as indium oxide ($In_2O_3$), tin dioxide ($SnO_2$), etc. covered with insulation layer 142 upon which electrochromic layer 143 such as tungsten oxide ($WO_3$), and molybdenum oxide is deposited, and the transparent electrode 144 of gold, aluminum copper, or indium oxide covers the layer 143. When a certain voltage is applied between both electrodes 141 and 144, the element is colored and then if inversely-polarized voltage is applied to the electrodes or they are short-circuited, the film becomes transparent. And also, depending upon the voltage, the half-tone can be obtained. Accordingly, the half-tone represents no stone placed and the aforementioned color represents black stones and the transparent color represents white stones with use of white glass substrate 140.

In order to distinguish a black stone from a white stone, a difference of shape can be employed as explained below.

Figure 8A:
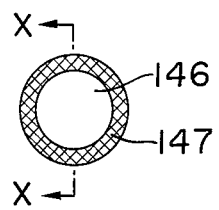
FIGS. 8(a), 8(b) and 8(c) are front views of another display element.
Figure 8B:
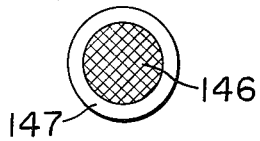
Figure 8C:
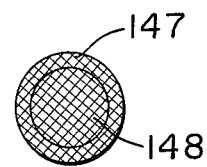
Figure 9:
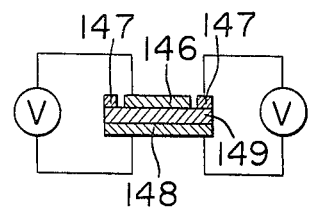
FIG. 9 is a cross section of an electrode of the display element.

FIG. 8 a represents a white stone and FIG. 8 b a black stone. The structure of the electrode of the display element is shown in FIG. 9, which shows a section indicated by the X—X line in FIG. 8. The upper electrode is composed of round electrode 146 at the center and ring electrode 147 insulated therefrom. Electrochromic layer 149 is put between upper electrodes 146 and 147 and lower electrode 148. Accordingly, if a voltage is applied between ring electrode 147 and lower electrode 148, a white stone can be represented as shown in FIG. 8a, and if voltage is applied between round electrode 146 and lower electrode 148, a black stone can be represented as shown in FIG. 8b. For representing a black stone, the voltage can be applied simultaneously to both electrodes 147 and 148 and electrodes 146 and 148. In this case, a black stone is as large in diameter as that of FIG. 8a as shown in FIG. 8c.

Figure 10:
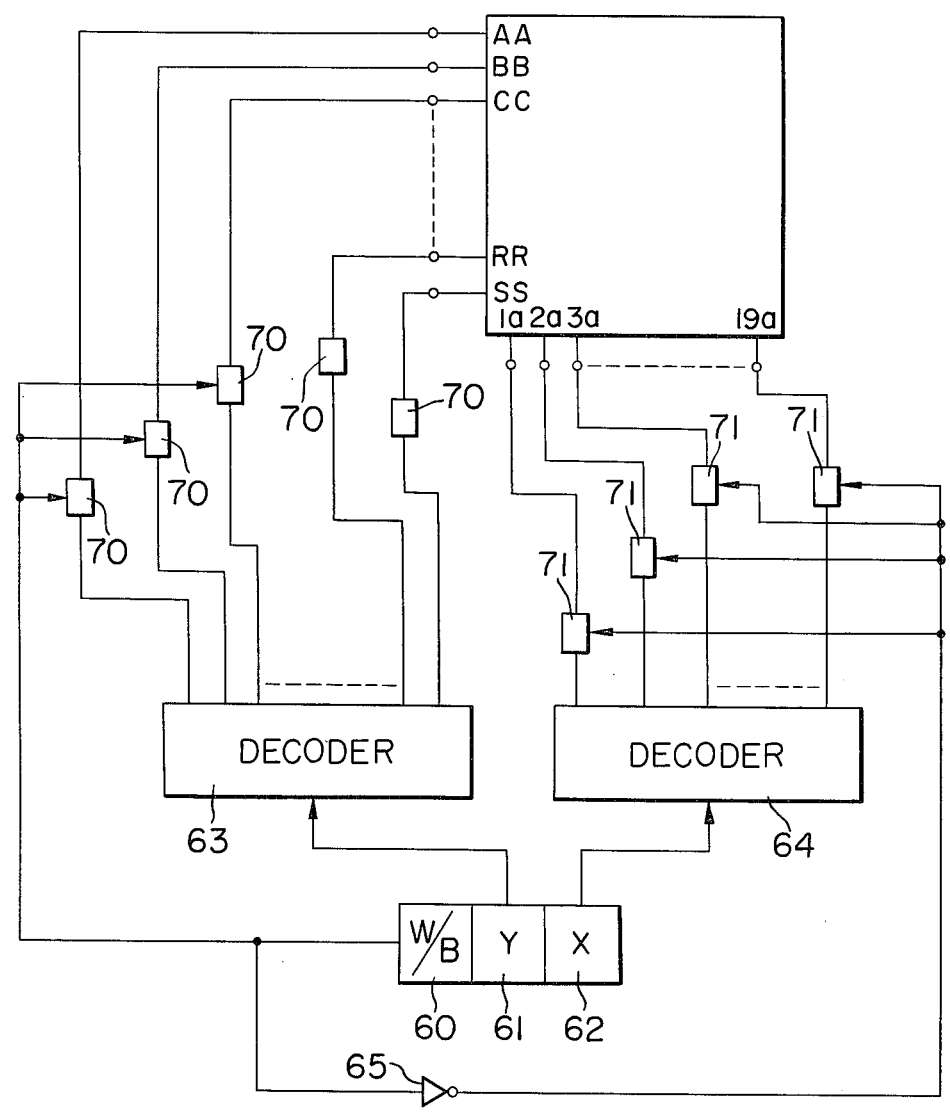
FIG. 10 is a block diagram of an embodiment of the data converter.

An example of the data converter which controls the memory-type display element by the information supplied from the tape, is shown in FIG. 10.

Latch 60 temporarily stores information to kinds of stones from the tape. Latches 61 and 62 temporarily store information as to lines A through S and information as to columns 1 through 19, respectively. These two latches 61 and 62 are connected to decoders 63 and 64, respectively. Decoder 63 has 19 outputs connected through voltage controllers 70 to leads AA through SS of display elements as in FIG. 6, and decoder 64 has outputs connected to leads 1a through 19a of the display elements through voltage controllers 71. The latch 60 has an output connected to each of the voltage controllers 70 and connected to each of the voltage controllers 71 through an inverter 65. When a voltage controller 70 receives both output signals from the latch 60 and decoder 63, controller 70 generates a signal at its corresponding terminal of AA to SS. Voltage controllers 71 function in the same way but the corresponding terminals 1a through 19a receive voltage signals of which polarity is invented on account of inverter 65.

As mentioned above, when information as to a black stone at the position (2, C) is fed to latches 60, 61, and 62, respectively, output of decoder 63 connected to terminal CC sends signals, controlled by the output of latch 61, to the voltage controller 70 connected to the terminal CC, and the controller begins to operate. Similarly, output of decoder 64 connected to terminal 2a sends signals, controlled by the output of latch 62, to the voltage controller 71 connected to the terminal 2a and the controller starts to function. The signal representing black stone information in latch 60 is sent to voltage controllers 70. At this time, since the voltage controller 70 connected to terminal CC is working, the potential of terminal CC is, for example, raised by the voltage controller. At the same time, since signals of latch 60, inverted by the inverter 65, are sent to voltage controllers 71, the potential of terminal 2a becomes low. Thus, display element 201 at position (2, C) becomes black, which means a black stone placed. Similarly, if information as to white stone at position (3, B) is sent to latches 60, 61, the latch 60 sends to voltage controllers 70 and 71 signals with inverse polarity, compared to that in the abovementioned process, and display element 200 at position (3, B) becomes white, which means a white stone placed.

Figure 11:
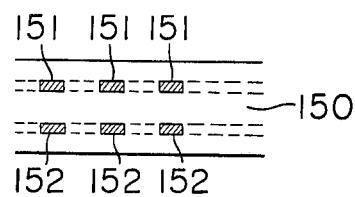
FIG. 11 is a front view of a tape.

And as shown in FIG. 11, one channel of the tape 150 records information 151 as to position and kind of a stone, and the other channel of tape 150 records information 152 representing commentary in human voice 152, for example "excellent play", "poor play", "KO", "shicho", and the information is picked up at the heads of the tape recorder from which information 151 is fed to data converter 102 and information 152 to speaker 107 via an audio-amplifier (refer to FIG. 2) and a representation of a stone on display board 111 is executed with oral explanation.

In this embodiment, an operator can represent a stone, independent of information as to stone from the tape, by manual input 104 such as manual operation by a key board. Manual input 104 is explained in FIG. 2. A line of switches 40a corresponds to vertical columns 1 through 19 in a GO board and a line of switches 40b corresponds to horizontal lines A through S. Button 40c corresponds to a white stone and 40d to a black and 40e to reset state (no stone placed).

Accordingly, if a white stone is to be placed at (2, C), button 2 in line 40a and button C in line 40b are pushed and button 40c is pushed. Similarly, if a black stone at (3, C) is to be removed, button 3 in line 40a, button C in button line 40b, and button 40d are pushed.

Buttons 40a and 40b are located just beside lines and columns, which is convenient to choice.

As mentioned above, tape 150 records information as to kind and position of a stone. Joining with this information, information designating "excellent play", "poor play" or "capture play", such as "KO" and "shicho" and information as to total used time, time elapsed by a stone placed, orderly number of plays, number of "hama", or turn of a white or a black stone, should be added for better representation on display 106.

The tape speed of tape 150 may be constant by means of an automatic device, or the tape may advance only at every operation for information as to both position and kind, for conserving recording space.

And also, to know the latest stone from the old stones it is convenient that the latest stone be flashing until the following stone is placed.

As explained clearly, this invention can provide an operator with a maintained representation on a board of stones in a game such as GO, RENJYU or OTHELLO or other games based upon information from a reproduction device through a recording medium like a tape, and the operator may be well trained efficiently only by looking at the board.

We claim:

1. An apparatus for reproducing a game having two kinds of pieces, comprising:
    a recording medium on which there is recorded information as to the kind and position of game pieces;
    pick-up means for picking up the information from the recording medium and producing an output;
    a display board having a plurality of electro-optic display elements arranged over the surface of the board and each capable of displaying a piece of one kind or the other kind, each of the electro-optic display elements comprising concentric circular areas including a central disc area and an annular area forming a border for the disc area, each area being capable of changing from the first appearance to a contrasting second appearance, and electrode means responsive to electrical signals for causing the change in appearance; and
    driving means for selectively applying electrical signals to electrode means of selected electro-optic display elements according to the output of the pick-up means to cause selected electro-optic display elements to display a piece of one kind and to cause selected electro-optic display elements to display a piece of the other kind, the electro-optic display elements for pieces of the one kind having only their annular area assume the second appearance, and the electro-optic display elements for the pieces of the other kind having at least their disc area assume the second appearance.

2. An apparatus in accordance with claim 1, wherein the electro-optic display elements for pieces of the other kind have only their disc area assume the second appearance.

3. An apparatus in accordance with claim 1, wherein the electro-optic display elements for pieces of the other kind have both their disc area and their annular area assume the second appearance.

* * * * *